US009770930B2

(12) United States Patent
Hart et al.

(10) Patent No.: US 9,770,930 B2
(45) Date of Patent: Sep. 26, 2017

(54) TAPE DRIVE AND TRANSFER PRINTER

(71) Applicant: VIDEOJET TECHNOLOGIES INC., Wood Dale, IL (US)

(72) Inventors: Philip Hart, Nottinghamshire (GB); Keith Buxton, Nottingham (GB)

(73) Assignee: VIDEOJET TECHNOLOGIES INC., Wood Dale, IL (US)

( * ) Notice: Subject to any disclaimer, the term of this patent is extended or adjusted under 35 U.S.C. 154(b) by 0 days.

(21) Appl. No.: 14/901,769

(22) PCT Filed: Oct. 16, 2014

(86) PCT No.: PCT/GB2014/053104
§ 371 (c)(1),
(2) Date: Dec. 29, 2015

(87) PCT Pub. No.: WO2015/059449
PCT Pub. Date: Apr. 30, 2015

(65) Prior Publication Data
US 2016/0368295 A1    Dec. 22, 2016

(30) Foreign Application Priority Data

Oct. 21, 2013 (GB) .................................. 1318575.6

(51) Int. Cl.
*B41J 33/16* (2006.01)
*B41J 17/02* (2006.01)
*B41J 33/34* (2006.01)
*G11B 15/46* (2006.01)
(Continued)

(52) U.S. Cl.
CPC ............... *B41J 33/16* (2013.01); *B41J 2/325* (2013.01); *B41J 17/02* (2013.01); *B41J 33/34* (2013.01); *G11B 15/32* (2013.01); *G11B 15/46* (2013.01)

(58) Field of Classification Search
CPC . B41J 29/393; B41J 29/38; B41J 29/02; B41J 11/42; B41J 13/02; B41J 2/04505
See application file for complete search history.

(56) References Cited

U.S. PATENT DOCUMENTS 4,479,081 A    10/1984  Harris
6,082,914 A     7/2000  Barrus et al.

FOREIGN PATENT DOCUMENTS

GB    2404896    2/2005
JP    S61199972  9/1986
(Continued)

*Primary Examiner* — Lamson Nguyen
(74) *Attorney, Agent, or Firm* — Robert L. Wolter; Beusse, Wolter, Sanks & Maire PLLC

(57) ABSTRACT

A tape drive comprising: first and second motors; first and second spool supports, respectively receiving first and second spools of tape, the first spool support being driveable by the first motor and the second spool support being drivable by the second motor; a sensor arranged to provide a signal indicative of linear movement of tape between the tape spools along a predetermined tape path; a controller arranged to control energization of said first and second motors for transport of the tape in at least one direction between the first and second spools of tape along the predetermined tape path; wherein the controller is arranged to generate data indicating the diameter of said first and second spools of tape based upon said signal provided by the sensor and data indicating rotation of each of said first and second spools.

22 Claims, 4 Drawing Sheets

(51) Int. Cl.
*G11B 15/32* (2006.01)
*B41J 2/325* (2006.01)

(56) References Cited

FOREIGN PATENT DOCUMENTS

| WO | 03029013 | 4/2003 |
| WO | 20080107646 | 9/2008 |

TAPE DRIVE AND TRANSFER PRINTER

The present invention relates to a tape drive, and more particularly, but not exclusively to a tape drive suitable for use in a transfer printer such as a thermal transfer printer.

Tape drives transfer tape from a first spool, often referred to a supply spool, to a second spool, often referred to as a take-up spool.

Tape drives find a wide variety of uses. One such example is in transfer printers—in which ink is transferred from an ink carrying tape, often referred to as a ribbon—which require a means for transporting the ribbon from the first spool to the second spool past a print head. Tape drives for use in transfer printers take a wide variety of forms, partially depending upon the nature of the printer in which the tape drive is used. For example dot matrix printers often use a multi-use ribbon which passes between a supply spool and a take up spool. When the supply spool is exhausted the direction of ribbon travel is reversed. This process continues a number of times. In such a printer there is no need for accurate placement of the ribbon relative to the printhead given the reusable nature of the ribbon. Additionally many dot matrix printers operate at relatively low speeds and have modest requirements in terms of ribbon acceleration and deceleration.

In contrast, thermal transfer printers make use of single use ribbon. In order to avoid ribbon wastage it is desirable to transport the ribbon between the spools, past the print head, in such a way that the position of the ribbon relative to the printhead can be accurately controlled. In this way the ribbon to be used in a new printing operation is positioned adjacent to that used in a preceding printing operation thereby minimizing ribbon wastage. Additionally, where single use ribbons are used it is important that unused ribbon is positioned at the print head during a printing operation as otherwise the printing operation will fail to transfer ink from the ribbon to a substrate thereby causing faulty printing.

The differing requirements of different types of printing technologies influence the choice of tape drive which is employed. For example, thermal transfer printing often has relatively challenging requirements not only in terms of accuracy of ribbon movement—as discussed above—but also in terms of ribbon acceleration and deceleration.

Some tape drives require that the diameter of one or both of the spools is determined in order to allow the spools to be rotated in a controlled manner to cause predetermined movement of the tape between the spools. For example it is known to use an optical system to determine spool diameters.

It is an object of the present invention to provide a tape drive which allows the diameters of the tape spools to be determined.

According to a first aspect of the present invention, there is provided, a tape drive comprising: first and second motors; first and second spool supports, respectively receiving first and second spools of tape, the first spool support being driveable by the first motor and the second spool support being drivable by the second motor; a sensor arranged to provide a signal indicative of linear movement of tape between the tape spools along a predetermined tape path; and a controller arranged to control energization of said first and second motors for transport of the tape in at least one direction between the first and second spools of tape along the predetermined tape path; wherein the controller is arranged to generate data indicating the diameter of said first and second spools of tape based upon said signal provided by the sensor and data indicating rotation of each of said first and second spools.

The first aspect of the invention therefore provides a tape drive which is configured to determine the diameters of two tape spools based upon data indicating the rotation of those spools and a signal provided by a sensor which indicates linear movement of tape between the two tape spools.

Linear movement of the tape may be monitored by the sensor in any convenient way. For example the sensor may comprise a roller and an encoder monitoring rotation of said roller, and tape may pass at least partially around said roller on said predetermined tape path. In this way rotation of the roller is indicative of the linear movement of the tape between the tape spools. The encoder may generate a signal indicating a number of rotations of said roller. Where the diameter (or a parameter having a fixed relationship with the diameter) of the roller is known monitoring rotation of the roller allows a determination of the actual linear movement of the tape to be made. The roller is preferably coated with a non-slip coating so as to cause movement of the roller to be accurately indicative of movement of the tape.

Each of the spools may be mounted on the output shaft of its respective motor. Alternatively, each of the spools may be mounted for rotation about a respective shaft and each of the shafts may be coupled to the output shaft of a respective motor by an appropriate coupling (e.g. a belt drive). The coupling between each spool and its motor may provide a fixed transmission ratio.

The controller may be arranged to provide a first signal to the first motor to cause rotation of the first spool of tape and movement of the tape between the spools along the predetermined path. The data indicating rotation of the first spool may comprise said first signal. That is, rotation of the first spool may be monitored based upon a drive signal provided to the motor driving that spool.

The controller may be arranged to receive a second signal indicating rotation of the second spool. For example, the controller may be arranged to receive a signal from the second motor indicating rotation of the second spool of tape caused by movement of the tape along the predetermined path. The data indicating rotation of the second spool may comprise said second signal. That is, the second spool may be monitored based upon a signal provided to the controller. The signal may be provided by a motor coupled to the second spool. The second motor may be de-energised.

The second signal may comprise a plurality of pulses generated by rotation of a rotor of the second motor within a stator of the second motor. The second signal may comprise a plurality of pulses indicative of back-EMF signals generated by rotation of the rotor of the second motor within the stator of the second motor.

The controller may be arranged to receive a third signal being a signal provided by the sensor. The controller may be arranged to generate said data indicating the diameter of each of said first and second spools based upon said first, second and third signals. That is, the diameters of the spools may be determined based upon a signal provided to drive a motor which rotates the first spool, a signal which indicates actual rotation of the second spool, and a signal which indicates linear movement of the tape.

Data indicating the diameter of the first spool may be generated based upon said first and third signals. Data indicating the diameter of the second spool may be generated based upon the second signal and at least one of the first and third signals.

The first signal may indicate a number of rotations of the first spool. The number may be any real number and need not be an integer. In some embodiments it may be preferred that the first signal indicates a number of rotations is about one or is greater than one so as to ensure that data relating to at least about a full revolution of the first spool is used in subsequent processing. The second signal may indicate a number of rotations of the second spool. Again, the number may be any real number and need not be an integer. The first and second signals may each comprise a plurality of pulses and it may be known that a particular number of pulses corresponds to a single rotation of the respective spool. In this way each of the pluralities of pulses can be converted into a number of rotations of the respective spool.

The controller may be arranged to: monitor said second signal; generate a drive signal for said second motor based upon said second signal; and provide said drive signal to said second motor. The drive signal may be synchronised with the second signal. For example, the second signal may be periodic and the generated drive signal may be periodic, the period of the drive signal (or a multiple thereof) being equal to the period of the second signal. The period of the second signal may be a multiple of the period of the drive signal.

The second signal may comprise a plurality of pulses having substantially equal time intervals therebetween. The controller may generate a drive signal comprising a plurality of drive pulses having the same substantially equal time intervals therebetween. Alternatively, the plurality of pulses may have varying time intervals therebetween, the varying time intervals representing an acceleration or deceleration. In such a case the drive signal may comprise a plurality of drive pulses which continues that acceleration or deceleration.

The controller may be arranged, during an operation to generate data indicating the diameter of said first and second spools, to energise the first motor and de-energise the second motor. The de-energised second motor may provide resistance to tape movement thereby causing tension in the tape. That is, during such an operation the tape drive may operate in a pull-drag mode in which all motion is caused by the motor driving a take-up spool and the motor coupled to a supply spool can, in such cases, simply provide resistance to tape motion.

The operation to generate data indicating the diameter of the first second spools may comprise a termination phase in which the first motor is decelerated at a rate of deceleration selected to maintain said tension in the tape. That is, it will be appreciated that where a heavy spool is mounted to a de-energised motor, rapid deceleration may result in the spool continuing to rotate because of its moment of inertia. Such continuing rotation may result in the tape becoming slack (i.e. tension in the tape becoming too low. Gradual deceleration of the motor driving the take-up spool, on the contrary, will tend to minimise any continuing rotation of the supply spool.

One or both of the first and second motors may be position controlled motors. That is, one or both of the first and second motors may be motors configured to receive and act upon a position-based control signal. For example, one or both of the first and second motors may be stepper motors. Another example of a position controlled motor which may be used in some embodiments of the invention is a DC-servo motor which comprises an encoder which monitors the position of the motor's rotor and thereby provides positional control by way of closed-loop feedback. In some embodiments of the invention other motors are used such as, for example, torque-controlled motors (e.g. DC motors).

The controller may be arranged, in a tape transport operation, to energise both of the motors in a common rotational direction. That is, both motors may be energised in the direction of tape transport to provide push-pull operation in which one motor drives a supply spool to pay out tape and another motor drives a take-up spool to take-up tape. By reference to tape transport operation it is intended to indicate an operation having as its purpose the transfer of tape (perhaps a predetermined linear quantity of tape) from one spool to the other spool, not an operation intended to configure or otherwise initialise the tape drive.

The controller may be arranged, in a tape transport operation, to generate control signals for at least one of the first and second motors based upon said generated data indicating the diameter of said first and second spools.

The controller may be arranged to control energization of the first and second motors for transport of the tape in both directions between the first and second spools of tape along the predetermined tape path. That is, the tape drive may allow for bi-directional movement of the tape between the spools.

The data indicating the diameter of said first and second spools may comprise a first length indicative of the diameter of the first spool and a second length indicative of the diameter of the second spool. The first length may be a radius or diameter of the first spool and the second length may be a radius or diameter of the second spool.

According to a second aspect of the invention, there is provided, a transfer printer comprising: a tape drive according to any preceding claim, wherein the tape is an ink carrying ribbon; and a printhead arranged to transfer ink from the ink carrying ribbon to a substrate to be printed.

The transfer printer may be a thermal transfer printer, and the printhead may be a thermal printhead.

According to a third aspect of the invention, there is provided a method for generating data indicating the diameter of first and second spools of tape in a tape drive in which tape is transported in at least one direction between the first and second spools along a predetermined tape path, the spools being respectively drivable by first and second motors, the method comprising: receiving a sensor signal indicating linear movement of tape between the tape spools along the predetermined tape path; and generating data indicating the diameter of said first and second spools of tape based upon said sensor signal and data indicating rotation of each of said first and second spools.

The method may further comprise the generation of said sensor signal by a sensor comprising a roller and an encoder monitoring rotation of said roller. Tape may pass at least partially around said roller on said predetermined tape path and said sensor signal may indicate a number of rotations of said roller.

The method may further comprise providing a first signal to the first motor to cause rotation of the first spool of tape and movement of the tape between the spools along the predetermined path. The data indicating rotation of the first spool may comprise said first signal.

The method may further comprise receiving a second signal from the second motor indicating rotation of the second spool of tape caused by movement of the tape along the predetermined path. The data indicating rotation of the second spool may comprise said second signal.

The method may also comprise generating said data indicating the diameter of each of said first and second spools based upon said first, second and third signals.

The method may further comprise monitoring said second signal; generating a drive signal for said second motor based upon said second signal; and providing said drive signal to said second motor. The drive signal may be synchronised with the second signal.

It will be appreciated that features discussed in the context of one aspect of the invention can be applied to other aspects of the invention. In particular, where features are described as being carried out by the controller in the first aspect of the invention it will be appreciated that such features can be used in combination with a method according to the third aspect of the invention.

The method of the third aspect of the invention can be carried out in any convenient way. In particular the method may be carried out by a printer controller and such a printer controller is therefore provided by the invention. The controller may be provided by any appropriate hardware elements. For example the controller may be microcontroller which reads and executes instructions stored in a memory, the instructions causing the controller to carry out a method as described herein. Alternatively the controller may take the form of an ASIC or FPGA.

Embodiments of the invention are now described, by way of example, with reference to the accompanying drawings, in which.

Figure 1:
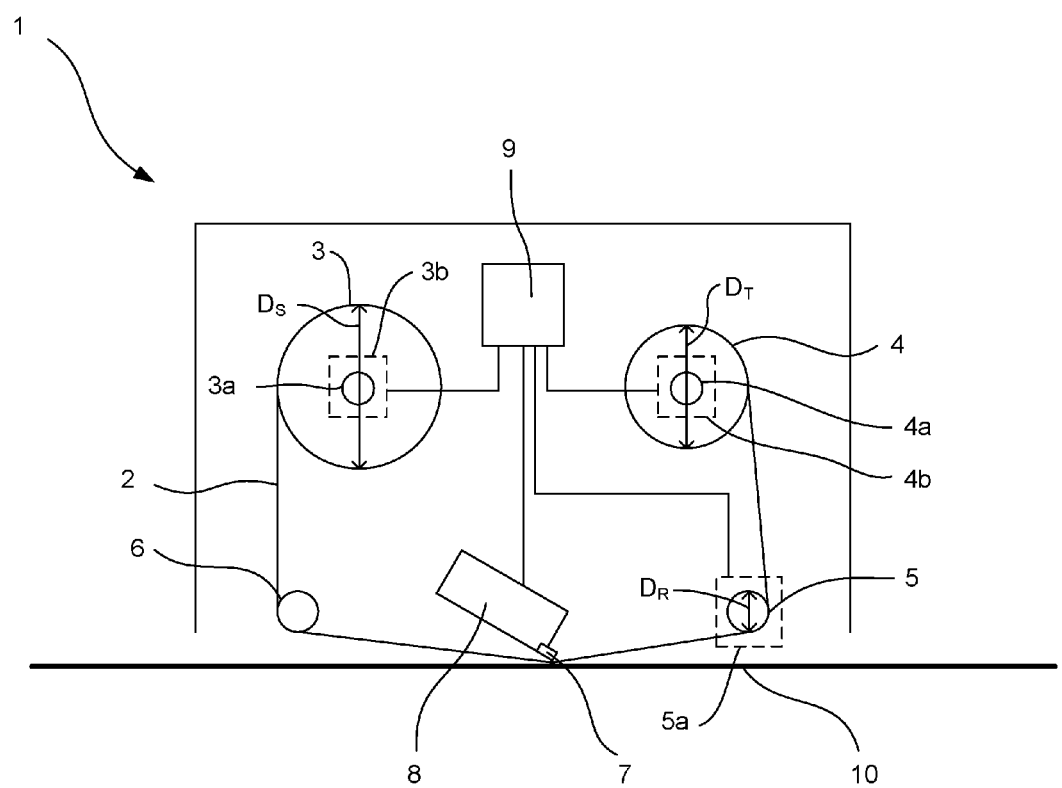
FIG. 1 is a schematic illustration of a thermal transfer printer in which embodiments of the invention may be implemented.

Referring to FIG. 1, a thermal transfer printer 1 comprises an ink carrying ribbon 2 which extends between two spools, a supply spool 3 and a takeup spool 4. In use, ribbon 2 is transferred from the supply spool 3 to the takeup spool 4 around rollers 5, 6, past print head 7 mounted to a printhead carriage 8. The supply spool 3 is mounted on a spool support 3a which is driven by a supply spool motor 3b. Similarly, the take-up spool 4 is mounted on a take-up spool support 4a which is driven by a take-up spool motor 4b. Each of the supply spool motor 3b and the take up spool motor 4b are controlled by a printer controller 9. In the embodiment described here each of the supply spool motor 3b and the take-up spool motor 4b are hybrid stepper motors (as opposed to variable reluctance or permanent magnet stepper motors). The use of a hybrid stepper motor is preferred as it gives a higher resolution (typically 1.8 degrees per full step) than other types of stepper motor, and can operate at high stepping rates with excellent holding and dynamic torque capability.

The stepper motor may be for example a Portescap motor having part number 34H118D30B.

While during operation the ribbon 2 is generally transferred from the supply spool 3 to the take-up spool 4, the controller 9 can also energise the motors so as to cause the ribbon 2 to be transferred from the take-up spool 4 to the supply spool 3. This can be useful in some printing modes as is described further below.

The rollers 5, 6 may be idler rollers, and serve to guide the ribbon 2 along a predetermined ribbon path as shown in FIG. 1. Rotation of the roller 5 is monitored by a sensor 5a. Specifically, the roller 5 is provided with a magnetic element. The sensor 5a can then monitor changes in magnetic field caused by rotation of the roller 5. The sensor 5a provides a signal to the printer controller 9 comprising a number of pulses sensed by the sensor 5a. Given knowledge of the number of pulses generated by a single rotation of the roller 5, the pulses provided to the printer controller 9 by the sensor 5a can be processed to determine a number of rotations (which will usually not be an integer number) of rotations of the roller 5.

The magnetic element may be a magnetic multipole ring as supplied by Austria Microsystems with part number AS5000-MR20-44. The sensor 5a may be a rotary magnetic position sensor, also supplied by Austria Microsystems and having part number AS5304.

The roller 5 comprises an aluminum shaft of diameter 8 mm and is coated with a non-slip coating. The non-slip coating may be a polyurethane material having a Shore A hardness of 50-70 and a thickness of 3.5 mm. Alternatively the non-slip coating may be a silicone rubber having a Shore A hardness of 50-55, and a thickness of 2.75 mm. The provision of a non-slip coating has the effect of ensuring that the roller 5 rotates consistently as the tape moves along the predetermined path. This means that the rotation of the roller 5 is an accurate indicator of tape movement. Rotation of the roller 5 is used in processing carried out by the printer controller 9 in the manner described below. The diameter of the roller 5 is known to the printer controller 9. In one embodiment the roller 5 has a diameter of 15 mm. It is preferable that the roller 5 has low rotational inertia, and it is for this reason that the shaft is made from aluminum.

In a printing operation, ink carried on the ribbon 2 is transferred to a substrate 10 which is to be printed on. To effect the transfer of ink, the print head 7 is brought into contact with the ribbon 2. The ribbon 2 is also brought into contact with the substrate 10. The print head 7 may be caused to move towards the ribbon 2 by movement of the print head carriage 8, under control of the printer controller 9. The print head 7 comprises printing elements arranged in a one-dimensional linear array, which, when heated, whilst in contact with the ribbon 2, cause ink to be transferred from the ribbon 2 and onto the substrate 10. Ink will be transferred from regions of the ribbon 2 which correspond to (i.e. are aligned with) printing elements which are heated. The array of printing elements can be used to effect printing of an image on to the substrate 10 by selectively heating printing elements which correspond to regions of the image which require ink to be transferred, and not heating printing elements which require no ink to be transferred.

There are generally two modes in which the printer of FIG. 1 can be used, which are sometimes referred to as a 'continuous' mode and an 'intermittent mode'. In both modes of operation, the apparatus performs a regularly repeated series of printing cycles, each cycle including a printing phase during which ink is transferred to the substrate 10, and a further non-printing phase during which the printer is prepared for the printing phase of the next cycle.

In continuous printing, during the printing phase the print head 7 is brought into contact with the ribbon 2, the other side of which is in contact with the substrate 10 onto which an image is to be printed. The print head 7 is held stationary during this process—the term "stationary" is used in the context of continuous printing to indicate that although the print head will be moved into and out of contact with the ribbon, it will not move relative to the ribbon path in the direction in which ribbon is advanced along that path. Both the substrate 10 and ribbon 2 are transported past the print head, generally but not necessarily at the same speed.

Generally only relatively small lengths of the substrate 10 which is transported past the print head 7 are to be printed upon and therefore to avoid gross wastage of ribbon it is necessary to reverse the direction of travel of the ribbon between printing cycles. Thus in a typical printing process in which the substrate is traveling at a constant velocity, the print head is extended into contact with the ribbon only when the print head 7 is adjacent regions of the substrate 10 to be printed. Immediately before extension of the print head 7, the ribbon 2 must be accelerated up to for example the speed of travel of the substrate 10. The ribbon speed must then be maintained at the constant speed of the substrate during the printing phase and, after the printing phase has been completed, the ribbon 2 must be decelerated and then driven in the reverse direction so that the used region of the ribbon is on the upstream side of the print head. As the next region of the substrate to be printed approaches, the ribbon 2 must then be accelerated back up to the normal printing speed and the ribbon 2 must be positioned so that an unused portion of the ribbon 2 close to the previously used region of the ribbon is located between the print head 7 and the substrate 10 when the print head 7 is advanced to the printing position. It is therefore desirable that the supply spool motor 3b and the take-up spool motor 4b can be controlled to accurately locate the ribbon so as to avoid a printing operation being conducted when a previously used portion of the ribbon is interposed between the print head 7 and the substrate 10.

In intermittent printing, a substrate is advanced past the print head 7 in a stepwise manner such that during the printing phase of each cycle the substrate 10 and generally but not necessarily the ribbon 2 are stationary. Relative movement between the substrate 10, the ribbon 2 and the print head 7 are achieved by displacing the print head 7 relative to the substrate and ribbon. Between the printing phases of successive cycles, the substrate 10 is advanced so as to present the next region to be printed beneath the print head and the ribbon 2 is advanced so that an unused section of ribbon is located between the print head 7 and the substrate 10. Once again accurate transport of the ribbon 2 is necessary to ensure that unused ribbon is always located between the substrate 10 and print head 7 at a time that the print head 7 is advanced to conduct a printing operation. It will be appreciated that where the intermittent mode is used, a mechanism is provided to allow the print head 7 to be moved along a linear track so as to allow its displacement along the ribbon path. Such a mechanism is not shown in FIG. 1 but is described in our earlier patent no. U.S. Pat. No. 7,150,572.

In each of the aforementioned modes, during the transfer of tape from the supply spool 3 to the take up spool 4, both the supply spool motor 3b and the take-up spool motor 4b are energised in the same rotational direction. That is, the supply spool motor 3b is energised to turn the supply spool 3 to pay out an amount of tape while the take-up spool motor 4b is energised to turn the take-up spool 4 to take-up an amount of tape. The motors can therefore be said to operate in "push-pull" mode. Where tension in the tape is to be maintained, it is important that the linear quantity of tape paid out by the supply spool is essentially equal to the linear quantity of tape taken up by the take-up spool. Additionally, as noted above it is desirable to transport a predetermined linear distance of tape between spools. This requires knowledge of the diameters of the spools given that the drive is applied to the spools and the linear length of tape transferred by a given rotational movement of the spools will vary in dependence upon the spool diameters. A technique for determining spool diameters is now described.

Figure 2:
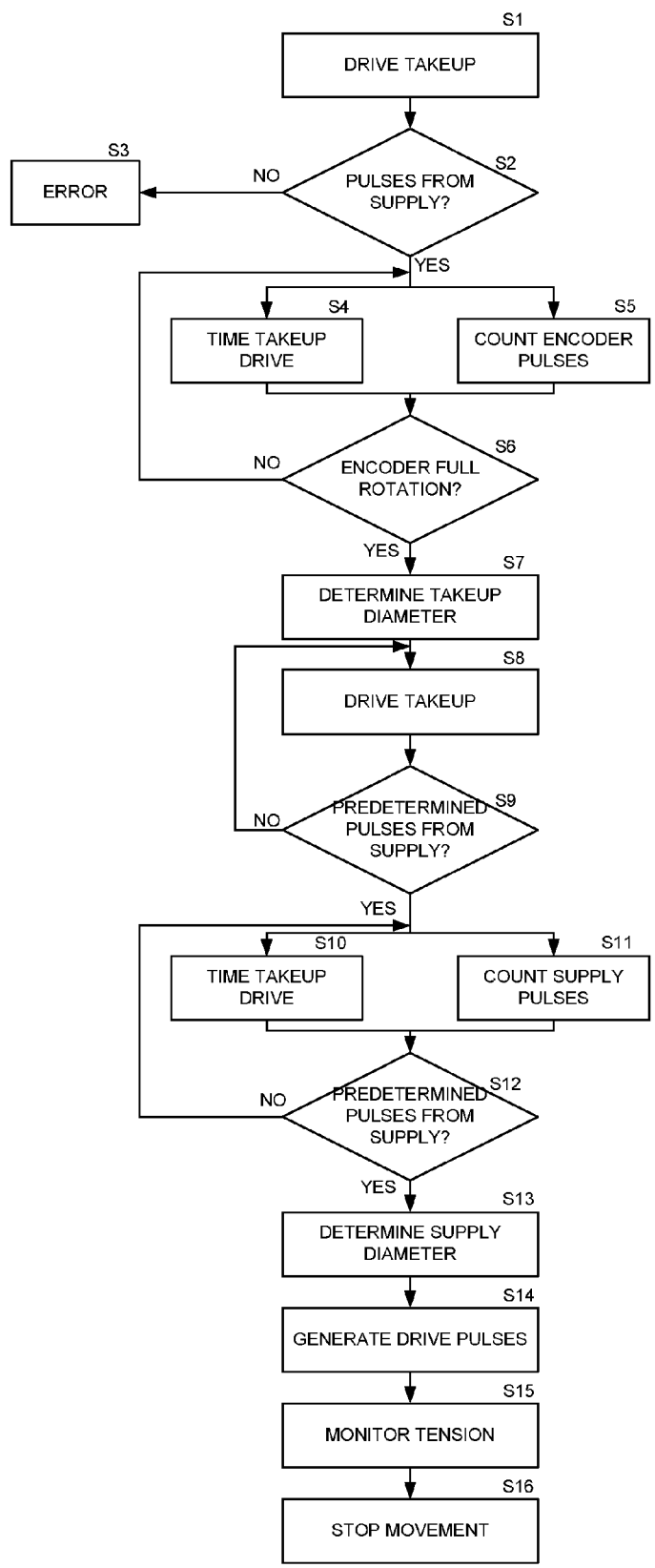
FIG. 2 is a flowchart showing processing carried out in the transfer printer of FIG. 1 to determine the diameters of the spools.

Referring to FIG. 2, at step S1 the take-up motor 4b is commanded to turn the take-up spool 4 at a relatively slow speed. In determining a speed at which to drive the take-up motor 4b, the diameter of the take-up spool 4 is assumed to be a maximum diameter which the printer supports, for example 90 mm or 95 mm. Using this assumed take-up spool diameter the take-up motor 4b is commanded to turn the take-up spool 4 at a rotational speed which corresponds to a linear ribbon speed of 350 mm/s. At this initial stage no information is available as to the actual diameter of either of the supply spool 3 or the take-up spool 4 meaning that the supply spool 3 cannot be driven without the risk that rotation of the take-up spool 4 and the supply spool 3 will not be properly synchronised which may result in the ribbon 2 becoming unacceptably loose or unacceptably tight so as to break. As such the supply spool motor 3b is not energised at this initial stage. Rather, the supply spool 3 is allowed to 'free wheel'. The supply spool motor 3b has an inherent detent torque which resists rotation, and this torque opposes the motion caused by the take-up spool motor 4b thereby causing tension in the ribbon 2.

The motion of the supply spool motor 3b caused by the movement of tape caused by rotation of take-up spool motor 4b will cause the supply spool motor 3b to generate a voltage across its windings. The voltage across the windings of the supply spool motor 3b will take the form of a periodic signal, which can be processed to generate a series of pulses, there being a predetermined number of pulses in a single rotation of the rotor of the supply spool motor 3b. This is described in more detail below.

At step S2 the printer controller 9 determines whether it has received the expected pulses from the supply spool motor 3b. For example, the printer controller may wait until the pulses received from the supply spool motor 3b indicate that the supply spool motor 3b has rotated $\frac{1}{3}$ of a full rotation. The nature of the pulses received from the supply spool motor 3b is such that a known number of pulses correspond to a single rotation of the supply spool motor 3b and consequently of the supply spool 3. If no pulses have been received, this indicates that the supply spool motor 3b has not moved, thereby indicating that there is no ribbon between the supply spool 3 and take up spool 4. It may be determined that the supply spool motor 3b has not moved if no pulses are received from the supply spool motor 3b in the time taken for the take-up spool 4 to rotate three rotations (determined based upon knowledge of the number of steps in a single revolution and the number of steps provided to the take-up spool motor 4b). In this case an error condition is generated at step S3.

If, however, the printer controller 9 determines at step S2 that pulses have been received from the supply spool motor 3b, processing passes to each of steps S4 and S5 which preferably operate in parallel. At step S4 a timer is maintained of the duration for which steps are provided by the printer controller 9 to the take-up spool motor 4b at a known step rate which corresponds to linear movement at 350 mm/s based upon the assumption as to take-up spool diameter noted above. At step S5 a count is maintained of pulses received by the printer controller 9 from the sensor 5a. During steps S4 and S5, the take-up motor 4b is driven at the constant speed determined above (i.e. steps are applied at a constant step rate), and it is assumed that there is sufficient tension in the tape to cause the roller 5 to also rotate at a constant speed.

Processing passes from each of steps S4 and S5 to step S6, where a determination is made whether a predetermined number of pulses corresponding to an entire rotation of the roller 5 have been received from the sensor 5a. The nature of the pulses provided by the sensor 5a is such that a known, predetermined number of pulses correspond to a single rotation of the roller 5, this being a function of the magnet which is fitted to the roller 5. Once the predetermined number of pulses is received from the sensor 5a, processing passes to step S7. Alternatively, if the number of pulses counted has not reached the predetermined number, then processing returns to steps S4 and S5 until the predetermined number of pulses associated with a complete revolution is reached.

At step S7 the diameter of the take-up spool 4 is determined. It will be appreciated that the nature of the number of steps provided to the take-up spool motor 4b is such that a known number of steps corresponds to a single rotation of the take-up spool motor 4b and consequently of the take-up spool 4. Furthermore, given the knowledge of the constant rate at which steps are applied to the take-up spool motor 4b, the time for which the take-up spool motor 4b is driven can be used to calculate a number of rotations through which the take-up spool motor 4b has been driven.

For the assumed linear speed at which the tape is moved, a time which would be expected to elapse at step S4 can be determined. A ratio between this expected time and the actual elapsed time is equal to the inverse of the ratio between the assumed spool diameter (90 mm) and the spool diameter which is to be determined. This principle is used to determine the diameter of the take-up spool 4 at step S7 according to equation (1):

$$D_T = D_{Assumed} \times \frac{T_{Assumed}}{T_{Actual}} \qquad (1)$$

where: $D_T$ is the diameter of the take-up spool 4;
$D_{Assumed}$ is the diameter of the take-up spool 4 assumed for the purposes of the processing described above (90 mm in the example);
$T_{Actual}$ is the time which elapsed at step S4;
$T_{Assumed}$ is the time which would have been expected to elapse for a single rotation of the roller 5 where the take-up spool 4 had the assumed diameter (90 mm in the example), this is given by:

$$T_{Assumed} = \frac{\pi D_R}{V_{linear}} \qquad (2)$$

where:
$V_{linear}$ is the assumed linear speed used during the processing described above (350 mm/s in the example); and
$D_R$ is the diameter of the roller 5.

It will be appreciated that in the process described above the number of pulses received from sensor 5a will be known to correspond to a single rotation, although the processing described herein is equally applicable for different numbers of pulses received from the sensor 5a (i.e. different numbers of rotations of the roller 5). In general terms, given the coupling of the take-up spool 4 and the roller 5 by the tape 2, the inverse ratio of the number of rotations of each of the roller 5 and the take up spool 4 should be equal to the ratio of the diameters of the roller 5 and the take-up spool 4. As such, the information provided to the printer controller 9 at steps S4 and S5 together with the known diameter of the roller 5, and the known step rate of the steps applied to the take-up spool motor 4b, allows the diameter of the take-up spool 4 to be determined. The processing carried out at step S7 can therefore be adapted to handle varying rotations of the roller 5 during the processing to determine the diameter of the take-up spool 4 by using equation (3):

$$D_T = D_R \times \frac{N_T}{N_R} \times \left[ \frac{P_R}{R_T \times T_T} \right], \qquad (3)$$

where: $D_T$ is the diameter of the take-up spool;
$D_R$ is the (known) diameter of the roller 5;
$N_T$ is the (known) number of steps required to cause a single rotation of the take-up motor 4b;
$N_R$ is the (known) number of pulses generated in a single rotation of the roller 5;
$P_R$ is the number of pulses received from the sensor 5a in step S5;
$R_T$ is the rate at which the steps are applied to the take-up motor 4b during steps S4 and S5; and
$T_T$ is the time measured at step S4.

Once the take-up spool diameter has been determined, processing passes to step S8, where the take-up spool 4 is driven at a speed which corresponds to a known linear ribbon speed. For example, a linear ribbon speed of 350 mm/s may be selected. It will be appreciated that while the ribbon was earlier driven at a target speed of 350 mm/s based on an assumed spool diameter, the take-up spool diameter now being known allows an accurate linear ribbon speed of 350 mm/s to be achieved. As such, the speed at which the take-up motor 4b is driven at step S8 is likely to be different from the speed at which the take-up spool motor was driven at during steps S4 and S5. That is, it should be noted that while the target ribbon speed is maintained at 350 mm/s in both cases in this example, the target ribbon speed may well not be equal in both cases, given that initially the diameter of the take-up spool 4 is not known.

Processing then passes from step S8 to step S9 where the printer controller 9 monitors the pulses received from the supply spool motor 3b. The take-up spool motor 4b is driven until the pulses received from the supply spool motor 3b indicate that the supply spool motor 3b has rotated a predetermined amount (or otherwise until a predetermined number of rotations of the take-up spool (e.g. three) have occurred, whereupon an error condition is notified). This predetermined amount of rotation of the supply spool motor 3b is sufficient to allow any speed change between the former ribbon speed and the newly controlled ribbon speed to settle. For example, the take-up spool motor 4b may be driven until the pulses received indicate that the supply spool motor 3b has rotated for two-fifths of a full rotation. Once the printer controller 9 determines at step S9 that the predetermined number of pulses have been received from the supply spool motor 3b, processing passes to each of steps S10 and S11 which preferably operate in parallel. At step S10 a timer is maintained of the duration for which steps are provided by the printer controller 9 to the take-up spool motor 4b. At step S11 a count is maintained of pulses received by the printer controller 9 from the supply spool motor 3b. During steps S10 and S11, the take-up motor 4b is driven at the constant speed determined above (i.e. steps are applied at a constant step rate), and it is assumed that there is sufficient tension in the tape to cause the supply spool 3 to also rotate at a constant speed.

Processing passes from each of steps S10 and S11 to step S12, where a determination is made whether a predetermined number of pulses has been received from the supply spool motor 3b. The predetermined number of pulses may correspond to a single rotation of the supply spool motor 3b. Allowing a whole rotation of the supply spool motor 3b ensures that the effect of any eccentricity in the winding of the tape on the supply spool 3 is eliminated from calculations of spool diameters. Once the predetermined number of pulses is received from the supply spool motor 3b, processing passes to step S13. Alternatively, if the number of pulses counted has not reached the predetermined number, then processing returns to steps S10 and S11 until the predetermined number of pulses is received from the supply spool motor 3b.

At step S13 the diameter of the supply spool 3 is determined. The number of steps provided to the take-up spool motor 4b is such that a known number of steps corresponds to a single rotation of the take-up spool motor 4b and consequently of the take-up spool 4. Furthermore, given the knowledge of the constant rate at which steps are applied to the take-up spool motor 4b, the time for which the take-up spool motor 4b is driven can be used to calculate a number of rotations through which the take-up spool motor 4b driven.

Given the coupling of the take-up spool 4 and the supply spool 3 by the tape 2, the inverse ratio of the number of rotations of each of the take-up spool 4 and the supply spool 3 should be equal to the ratio of the diameters of the take-up spool 4 and the supply spool 3. As such, the information provided to the printer controller 9 at steps S10 and S11 together with the known diameter of the take-up spool 4, and the known step rate of the steps applied to the take-up spool motor 4b, allows the diameter of the supply spool 3 to be determined by the printer controller 9 at step S13 according to equation (4):

$$D_S = D_T \times \frac{N_S}{N_T} \times \left[\frac{R_T \times T_T}{P_S}\right], \quad (4)$$

where: $D_S$ is the diameter of the supply spool 3;
$D_T$ is the diameter of the take-up spool 4 determined at step S7;
$N_S$ is the (known) number of pulses generated in a single rotation of the supply spool 3;
$N_T$ is the (known) number of steps required to cause a single rotation of the take-up motor 4b;
$R_T$ is the rate at which the steps are applied to the take-up motor 4b during steps S10 and S11;
$T_T$ is the time measured at step S10; and
$P_S$ is the number of pulses received from the supply spool 3 in step S11.

It will be appreciated that in the process described above the number of pulses received from the supply spool motor 3b will be known to correspond to one rotation. However, different predetermined numbers of pulses may be used at step S12.

Processing then passes from step S13 to step S14. The processing of step S14 is intended to generate pulses to actively drive the supply spool motor 3b at the rate at which it is currently moving, and in a synchronised way. Pulses are generated at a rate based upon the known linear velocity of tape, and the calculated supply spool diameter. The printer controller 9 monitors the pulses received from the supply motor 3b so as synchronise the application of the generated pulses to the supply spool motor 3b, with the pre-existing rotation of the supply spool caused by the driven rotation of the takeup spool 4.

Having generated drive pulses at step S14, these are applied to the supply spool motor 3b. A number of further pulses may be received from the supply spool motor 3b before the drive pulses are applied. For example, a further three pulses may be observed before the drive pulses are applied to the supply spool motor 3b. Furthermore, before any drive pulses are applied to the supply spool motor 3b, the phase of the controller of the supply spool motor 3b is reset to be in a known phase. This is described in more detail below with reference to FIG. 3. At this stage, the transport of tape is controlled in a push-pull manner, the motion of the supply spool motor 3b being coordinated with that of the take-up spool motor 4b. During this motion tension in the tape is monitored at step S15 and if necessary corrected. The monitoring of tension can be carried out based upon the monitoring of power consumed by the supply spool motor 3b and the take-up spool motor 4b using the techniques described in our earlier patents, for example U.S. Pat. No. 7,150,572, the contents of which are incorporated herein by reference. Alternatively tension can be monitored using a tension monitoring device such as a load cell positioned such that that ribbon (directly or indirectly) bears against the load cell such that the tension in the ribbon is measured by the load cell. Other tension monitoring techniques are of course well known in the art.

Processing passes from step S15 to step S16 where the supply spool motor 3b and the take-up spool motor 4b are controlled so as to cause the ribbon to come to a controlled stop. This is important in ensuring that tension in the tape is maintained during the deceleration process.

Figure 2A:
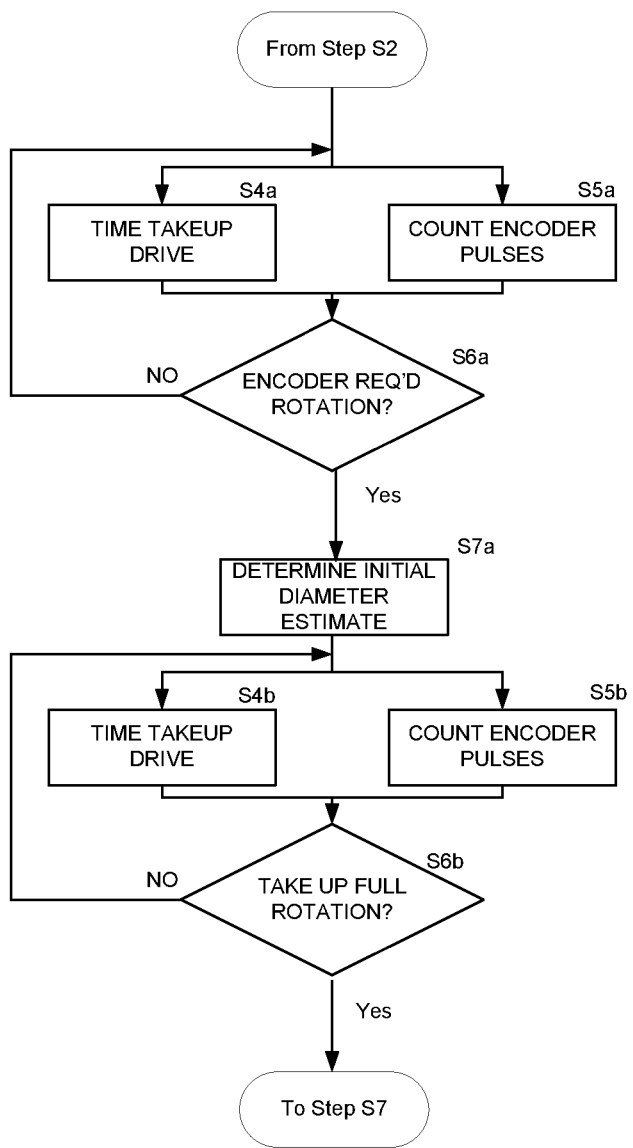
FIG. 2A is a flowchart showing an alternative to some of the processing shown in FIG. 2.

In an alternative embodiment, the processing described with reference to steps S4 to S6 may be replaced with processing shown in FIG. 2A which is now described. At step S4a a timer is maintained of the duration for which steps are provided by the printer controller 9 to the take-up spool motor 4b at a known step rate. At step S5a a count is maintained of pulses received by the printer controller 9 from the sensor 5a. Processing passes from each of steps S4a and S5a to step S6a, where a determination is made whether a predetermined number of pulses corresponding to a partial rotation (e.g. a quarter rotation) of the roller 5 have been received from the sensor 5a. If the number of pulses counted has not reached the predetermined number, then processing returns to steps S4a and S5a until the predetermined number of pulses associated with a complete revolution is reached.

When it is determined at step S6a that the predetermined number of pulses has been received from the sensor 5a, an initial estimate of take-up spool diameter is determined at step S7a using techniques described above based upon the relationship between rotation of the take-up spool 4 and roller 5 and upon the known diameter of the roller 5. Processing then passes to steps S4b and S5b which again operate in parallel as described above.

At step S4b a timer is maintained of the duration for which steps are provided by the printer controller 9 to the take-up spool motor 4b at a known step rate. At step S5b a count is maintained of pulses received by the printer controller 9 from the sensor 5a. Processing passes from each of steps S4b and S5b to step S6b, where a determination is made whether a predetermined number of pulses have been received from the sensor 5a. The predetermined number of pulses is a number of pulses indicating that the roller 5a has turned through a number of rotations which correspond to a full rotation of the take-up spool 4, the number being based upon the initial estimate of the diameter of the take-up spool 4 as determined at step S7a. Once the predetermined number of pulses is received from the sensor 5a, processing continues at step S7 which operates in the general manner described above. Alternatively, if the number of pulses counted has not reached the predetermined number, then processing returns to steps S4b and S5b until the predetermined number of pulses associated with a complete revolution is reached.

The processing described with reference to FIG. 2A may be preferred as it bases a determination of take-up spool diameter upon a full rotation of the take-up spool, thereby allowing any eccentricity in the winding of the take-up spool 4 to be properly taken into account.

It will be appreciated that the diameter of the supply spool 3 can alternatively be calculated based upon the diameter of the roller 5 and a number of pulses received from each of the sensor 5a and the supply spool motor 3b for a given movement of tape. Furthermore, the diameters of the supply spool 3 and the take up spool 4 could be determined in parallel processing steps (i.e. not requiring the take-up spool 4 diameter to be determined before determining the supply spool 3 diameter).

The generation of pulses by the supply spool motor 3b caused by rotation of the supply spool motor 3b occasioned by the movement of tape by the take-up spool motor 4b will now be described in more detail with reference to FIG. 3.

Figure 3:
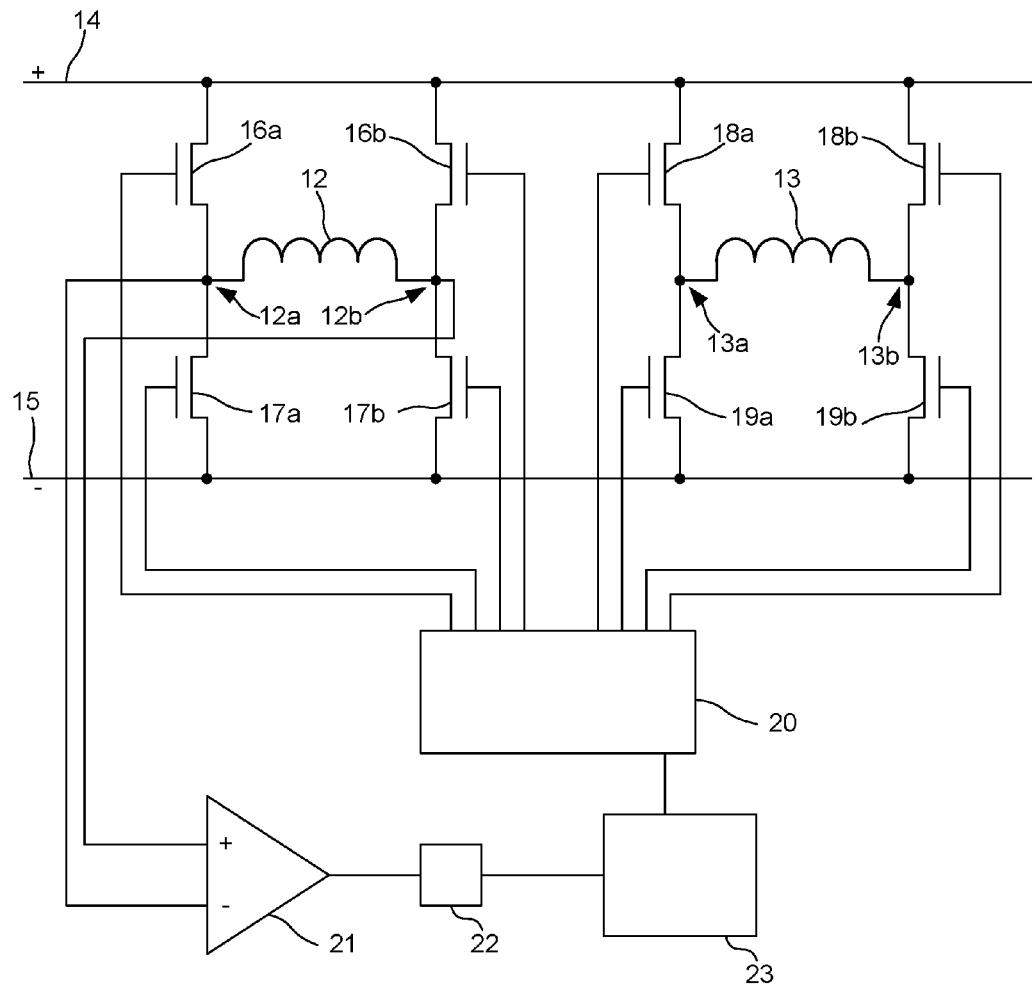
FIG. 3 is a schematic illustration of a motor of the printer of FIG. 1 and its associated control circuitry.

FIG. 3 shows the control circuit for the supply spool motor 3b. The take-up spool motor 4b and its control may have similar form. The rotor of the supply spool motor 3b (not shown) has a number of teeth equally spaced around its circumference. The supply spool motor 3b has two windings 12, 13. Each of the windings 12, 13 is a bipolar winding, and the windings 12, 13 are connected in an 'H-bridge' configuration. Respective first ends 12a, 13a of the windings 12, 13 are connected to either a positive rail 14 of a power supply through a respective switch 16a, 18a, or to a negative rail 15 of a power supply through a respective switch 17a, 19a. Respective second ends 12b, 13b of the windings 12, 13 are connected to either the positive rail 14 of the power supply through a respective switch 16b, 18b, or to the negative rail 15 of a power supply through a respective switch 17b, 19b.

Switches 16a, 16b, 17a, 17b, 18a, 18b, 19a, 19b are controlled by a stepper motor controller 20 to connect the respective ends 12a, 12b, 13a, 13b of the windings 12, 13 to the power supply, causing current to flow in the windings 12, 13 when connected. The stepper motor controller 20 may, in some embodiments, be a Trinamic TMC262 controller. It will be appreciated that current can be caused to flow in either direction in the windings 12, 13 by closing of a pair of diagonally opposed switches. For example, current can be made to flow in a first direction in the winding 12 by closing switches 16a and 17b, and current can be made to flow in a second direction, opposite to the first direction in the winding 12, by closing switches 16b and 17a.

Causing current to flow in the windings 12, 13 in this way (in either direction) will be referred to as energising the windings 12, 13. It will be appreciated that energisation of the windings 12, 13 causes magnetic poles to be created on a subset of the poles of the stator.

During drive of the stepper motor 3b, when the windings 12, 13 are energised the teeth of the rotor align with the poles created by the energisations. The windings 12, 13 are energised in a repeating sequence of energisations (e.g. winding 12 in a first direction, winding 13 in a first direction, winding 12 in a second direction, winding 13 in a second direction) causing the poles to rotate. The rotor correspondingly rotates, and alignment of the rotor with the moving poles causes rotation of the rotor.

The windings 12, 13 may be energised in full-step or half-step operation where they are switched 'on' or 'off'. Alternatively, the windings 12, 13 may be energised in micro-step operation, where the windings 12, 13 are switched partially on (i.e. by pulsing the switches 16a, 16b, 17a, 17b, 18a, 18b, 19a, 19b), to achieve a rotation of the rotor which is less than a full-step or a half-step, i.e. a micro-step. The position of the rotor may thus be advanced in steps, half-steps or micro-steps. One-eighth-stepping operation is an example of micro-step operation and allows the division of each full-step into eight micro-steps. The driving of a motor in micro-step operation will be well known to one of ordinary skill in the art. The driving of the motor in such micro-step operation is controlled by the stepper motor controller 20.

When the motor windings 12, 13 are not energised, movement of the rotor of supply spool motor 3b caused by an external force applied to the rotor—here the "pull" of the ribbon 2 caused by the take-up spool motor 4b—causes the rotor teeth to move past the stator windings 12, 13. This movement causes a voltage to be generated in the stator windings, 12, 13. That is, the supply spool motor 3b is operated as a generator. The created voltage is referred to as a back-EMF.

As the rotor teeth pass the stator windings 12, 13 the back-EMF will have the form of a sinusoid. Each of the windings 12, 13 of a stepper motor will exhibit a sinusoidal back-EMF waveform when the rotor is rotated by an external force.

The sinusoid created across the winding 12 is processed to generate a pulse-wave form. It will be appreciated that the number of pulses generated by such processing for a single rotation of the rotor of the motor will be determined by the structure of the rotor and stator of the stepper motor. It will further be appreciated that a drive signal to the stepper motor controller 20 can be based upon the pulse-wave form generated from the sinusoids. For example, if one-eighth-step is operation preferred, then a series of 'micro-step' signals are provided to the stepper motor controller 20 so as to drive the stepper motor a series of one-eighth steps.

The processing to generate said stepper motor drive signal is now described in more detail. The first and second ends 12a, 12b of the winding 12 are connected to the inputs of a differential amplifier 21. In practice the actual signals on each of the differential amplifier inputs is a half-wave rectified signal since each of the switches 17a, 17b, 19a, 19b is a MOSFET transistor which has an inherent diode characteristic that connects any negative-going voltage to the negative rail 15 of the power supply through this forward conductive diode. As such, the output of the differential amplifier 21 has the form of a half-wave signal and is connected to the input of a comparator 22 which acts as a zero crossing detector. In some embodiments the signal may have the form of a trapezoid half-wave signal. The output of the zero crossing detector has the form of a square wave, which has a first value when the output of the differential amplifier 21 is positive and a second value when the output of the differential amplifier 21 is at the negative rail 15 voltage. The output of the zero crossing detector is connected to the input of a controller 23.

The controller 23 is an FPGA. The FPGA 23 processes the output of the zero crossing detector to generate a signal which is provided to an input of the stepper motor controller 20. The stepper motor controller 20, in response to the signal generated by the controller 23, controls the energisation of the windings 12, 13 so as to drive the motor 3b in synchronisation with the detected movement of the rotor.

The stepper motor controller 20 has a plurality of inputs which allow the energisation of the windings 12, 13 to be controlled to effect micro-step operation of the stepper motor 3b.

A step input is controlled by pulses for each commanded step or micro-step movement of the stepper motor. A step-mode input determines whether each movement of the stepper motor should be a full-, half- or micro-step movement of the stepper motor 3b. For example, if the step-mode input is set to one-eighth-step, then each pulse on the step input will cause the motor windings 12, 13 to be energised so as to cause the motor to advance by an eighth-step. An enable input to the stepper motor controller 20 can be provided with an 'enable' signal. If the enable signal is not provided, then any step command signals applied to the step input will not cause the motor windings 12, 13 to be energised.

It will be appreciated that depending on the step-mode selected, the number of energisations in the repeating sequence described above will vary. For example, given that the motor 3b has two bipolar windings, in full-step operation, there are four distinct energisations of the two windings 12, 13. However, the same motor operating in one-eighth-step mode will have 32 distinct energisations of the two windings 12, 13. Therefore, to ensure the correct energisation sequence is achieved, the stepper motor controller 20 will maintain an internal reference position such that when a step signal is received on the step input the stepper motor controller 20 knows which energisation in the repeating sequence is to be next applied. For each step executed, the internal reference position is advanced by one energisation in the sequence.

It will also be appreciated that the output of the zero-crossing detector 22 is a periodic signal, the period of which is the same as the period of the repeating sequence of energisations (e.g. four full-steps, or 32 one-eighth-steps). For a particular one of the windings 12, 13, when the motor is unpowered, the threshold of the zero-crossing detector (e.g. whether there is any non-zero offset), and whether a rising edge or falling edge of the periodic signal is observed allows a determination to made as to how the monitored voltage corresponds to a voltage which may be applied by the stepper motor controller 20 (i.e. if the motor were to be energised). That is, the voltage induced in one of the windings 12, 13 of the motor when unpowered may be 'matched' to a particular one of the energisations which may be applied by the stepper motor controller 20 and from this the stepper motor controller 20 can determine which of the regularly repeating pattern of energisations should next be applied to the stepper motor.

To drive the stepper motor 3b it will be necessary to synchronise the actual angular position of rotor of the stepper motor (as determined by the comparison of the induced voltage and the voltage associated with the different energisations) with the internal reference position of the stepper motor controller 20, such that the commanded step signals applied to the step input of the stepper motor controller 20 cause the correct energisation to be applied to the windings 12, 13 when the drive to the motor is enabled. To achieve this synchronisation, the controller 23 interrogates an interface of the stepper motor controller 20, which provides an output which is indicative of the internal reference position of the stepper motor controller 20. If the internal reference position corresponds to the energisation before the energisation which corresponds to the pulse generated by the zero crossing detector 22, then applying a step command to the stepper motor controller 20 at the same time as the pulse is received from the zero-crossing detector 22 will cause the windings 12, 13 to be energised in the correct manner so as to synchronise the commanded movement of the stepper motor 3b with the rotation of the stepper motor 3b by the external force.

On the other hand, if the internal reference position of the stepper motor controller 20 is not the correct energisation (as described above) then applying a step command to the stepper motor controller 20 will not cause the windings 12, 13 to be energised in the correct fashion. However, the internal reference position of the stepper motor controller 20 can be advanced by applying step commands to the step input while the outputs of the stepper motor controller are not enabled (i.e. by not providing an enable signal to the enable input). In this way, it is possible for the controller 23 to advance the internal reference position of the stepper motor controller 20 to correspond to the known step (and micro-step) position of the pulses created by the zero-crossing detector 22, such that the commanded movement of the stepper motor 3b can be synchronised with the rotation of the stepper motor 3b by the external force. Once the correct internal reference position has been achieved, an enable signal can be provided on the enable input, and a further step command applied to the step input. This further step command will cause the windings 12, 13 to be energised in synchronisation with the angular position of the rotor of the stepper motor 3b.

In alternative implementations the stepper motor controller 20 may allow the internal reference position of the stepper motor controller to be reset, and this can be used to allow pulses to be correctly applied to the stepper motor controller 20.

It will be appreciated that once a first synchronised step command is applied, subsequent step commands will cause the motor to advance in a synchronised fashion, with the internal reference position of the stepper motor controller 20 being advanced as the rotor of the stepper motor 3b is also advanced.

It has been explained above that at step S9 a drive signal is provided to the supply spool motor 3b. Having provided this drive signal the printer controller has control over rotation of each of the spools and can therefore bring the spools to a controlled stop by decelerating the motors in synchronisation with each other at step S11. This is useful in that if no drive signal is provided to the supply spool motor 3b during deceleration, the inertia of the supply spool 3 may cause the supply spool 3 to continue to rotate after the take-up spool 4 has come to rest, thereby causing the tape to become slack between the supply spool 3 and the take-up spool 4. If, however, it is desired to bring the spools to rest without providing a drive signal to the supply spool motor 3b, this can be achieved by applying a very slow deceleration to the take-up motor 4b thereby minimising the risk that the supply spool 3 will continue to rotate after the take-up spool 4 has been brought to rest. For example, a deceleration over a period of at least one second might be appropriate in some embodiments, providing a deceleration of 0.35 m/s$^2$ or less.

The preceding description has been based upon an arrangement in which rotation of the supply spool is monitored based upon back-EMF induced by movement of the motor while de-energised. It will be appreciated that rotation of the supply spool 3 may be monitored in other ways. For example in some embodiments a process for determining the diameters of two spools may comprise first and second phases. In a first phase the take-up motor may be driven through a predetermined number of steps and a number of rotations of the roller 5 may be monitored, the relationship between steps provided and rotations of the roller 5 being used in the manner described above to determine the diameter of the take-up spool. In a second phase, the supply spool motor 3*b* may be driven through a predetermined number of steps in a direction opposite to that in which the take-up spool motor 4*b* was driven in the first phase and a number of rotations of the roller 5 may be monitored, the relationship between steps provided and rotations of the roller 5 being used in the manner described above to determine the diameter of the supply spool 3. While reference is made here to rotation of each of the motors through a predetermined number of steps, it will be appreciated that in alternative implementations the motors may be driven through a number of steps required to cause a predetermined number of rotations of the roller 5.

It has been described above that rotation of the roller 5 is monitored by virtue of a magnet provided on the roller 5, rotation of which is sensed by a sensor 5*a*. It will be appreciated that other methods can be used to monitor rotation of the roller 5. Indeed, any rotary encoder can be mounted on the roller 5 to monitor its rotation. Some such encoders are optical encoders.

As an alternative to monitoring rotation of the supply spool 3 based upon pulses (e.g. Back-EMF pulses generated by the supply spool motor 3*b*), the supply spool may be fitted with an encoder (which may be a magnetic arrangement of the type described with reference to the roller 5 or alternatively an optical encoder) the encoder generating a known number of pulses in a single revolution of the supply spool 3.

The printer controller 9 has been described above, as has a stepper motor controller 20 and various circuitry associated therewith. It will be appreciated that the printer controller 9 can take any suitable form (e.g. it may be a programmable microprocessor in communication with a memory storing appropriate instructions, or it may comprise bespoke hardware elements such as an ASIC). The stepper motor controller may be integral with the printer controller 9, although in some embodiments the stepper motor controller 20 is a controller dedicated to control of one or more stepper motors which communicates with the printer controller 9. It will be appreciated that the printer controller 9 may be provided by a plurality of discrete devices. As such, where functions have been attributed to the printer controller 9, it will be appreciated that such functions can be provided by different devices which together provide the printer controller 9.

While various embodiments of the invention have been described above, it will be appreciated that various modifications can be made to the described embodiments without departing from the spirit and scope of the present invention.

The invention claimed is:

1. A tape drive comprising:
   first and second motors;
   first and second spool supports, respectively receiving first and second spools of tape, the first spool support being driveable by the first motor and the second spool support being drivable by the second motor;
   a sensor arranged to provide a signal indicative of linear movement of tape between the tape spools along a predetermined tape path;
   a controller arranged to control energization of said first and second motors for transport of the tape in at least one direction between the first and second spools of tape along the predetermined tape path;
   wherein the controller is arranged to generate data indicating the diameter of said first and second spools of tape based upon said signal provided by the sensor and data indicating rotation of each of said first and second spools;
   wherein the controller is further arranged to monitor data indicating rotation of the second spool of tape, to generate a drive signal for said second motor based upon said rotation signal, and to provide said drive signal to said second motor.

2. A tape drive according to claim 1, wherein said sensor comprises a roller and an encoder monitoring rotation of said roller, and wherein tape passes at least partially around said roller on said predetermined tape path.

3. A tape drive according to claim 2, wherein the encoder generates a signal indicating a number of rotations of said roller.

4. A tape drive according to claim 1, wherein the controller is arranged to provide a first signal to the first motor to cause rotation of the first spool of tape and movement of the tape between the spools along the predetermined path, and wherein the data indicating rotation of the first spool comprises said first signal.

5. A tape drive according to claim 4, wherein the controller is arranged to receive a second signal from the second motor indicating rotation of the second spool of tape caused by movement of the tape along the predetermined path and wherein the data indicating rotation of the second spool and said rotation signal comprises said second signal.

6. A tape drive according to claim 5, wherein said second signal comprises a plurality of pulses generated by rotation of a rotor of the second motor within a stator of the second motor.

7. A tape drive according to claim 6, wherein said pulses are back-EMF pulses.

8. A tape drive according to claim 5, wherein the controller is arranged to receive a third signal being a signal provided by the sensor.

9. A tape drive according to claim 8, wherein the controller is arranged to generate said data indicating the diameter of each of said first and second spools based upon said first, second and third signals.

10. A tape drive according to claim 9, wherein data indicating the diameter of the first spool is generated based upon said first and third signals.

11. A tape drive according to claim 9, wherein data indicating the diameter of the second spool is generated based upon the second signal and at least one of the first and third signals.

12. A tape drive according to claim 5, wherein the second signal indicates a number of rotations of the second spool.

13. A tape drive according to claim 4, wherein the first signal indicates a number of rotations of the first spool.

14. A tape drive according to claim 1, wherein the drive signal is synchronised with the data indicating rotation of the second spool of tape.

15. A tape drive according to claim 1, where the controller is arranged, during an operation to generate data indicating the diameter of said first and second spools, to energise the first motor and de-energise the second motor.

16. A tape drive according to claim 15, wherein the de-energised second motor provides resistance to tape movement thereby causing tension in the tape.

17. A tape drive according to claim 16, wherein the operation to generate data indicating the diameter of the first second spools comprises a termination phase in which the first motor is decelerated at a rate of deceleration selected to maintain said tension in the tape.

18. A tape drive according to claim 1, wherein the controller is arranged, in a tape transport operation, to generate control signals for at least one of the first and second motors based upon said generated data indicating the diameter of said first and second spools.

19. A tape drive according claim 1, wherein the controller is arranged to control energization of the first and second motors for transport of the tape in both directions between the first and second spools of tape along the predetermined tape path.

20. A tape drive according to claim 1, wherein the data indicating the diameter of said first and second spools comprises a first linear quantity indicative of the diameter of the first spool and a second linear quantity indicative of the diameter of the second spool.

21. A tape drive according to claim 20, wherein the first linear quantity is a ratio or diameter of the first spool and the second linear quantity is a ratio or diameter of the second spool.

22. A method for generating data indicating the diameter of first and second spools of tape in a tape drive in which tape is transported in at least one direction between the first and second spools along a predetermined tape path, the spools being respectively drivable by first and second motors, the method comprising:
   receiving a sensor signal indicating linear movement of tape between the tape spools along the predetermined tape path; and
   generating data indicating the diameter of said first and second spools of tape based upon said sensor signal and data indicating rotation of each of said first and second spools; and
   monitoring data indicating rotation of the second spool of tape, generating a drive signal for said second motor based upon said rotation of the second spool, and providing said drive signal to said second motor.

* * * * *